United States Patent [19]
Butcher et al.

[11] 3,924,888
[45] Dec. 9, 1975

[54] BUMPERS FOR VEHICLES

[76] Inventors: Thomas V. Butcher, Route 2 Box 363A, Bristolville, Ohio 44406; Donald H. Stitt, 182 Budd St., Sharon, Pa. 16146

[22] Filed: Dec. 26, 1974

[21] Appl. No.: 536,541

[52] U.S. Cl. .................................. 293/76; 293/99
[51] Int. Cl.² .......................................... B60R 19/04
[58] Field of Search ........... 293/1, 60, 62, 69 R, 70, 293/71 R, 73, 74, 75, 76, 77, 85, 89, 97, 98, 99

[56] References Cited
UNITED STATES PATENTS

| | | | |
|---|---|---|---|
| 1,416,358 | 5/1922 | Krefl | 293/98 X |
| 1,578,062 | 3/1926 | Amberg | 293/74 |
| 3,596,963 | 8/1971 | Phillips | 293/76 |
| 3,820,834 | 6/1974 | Wilfert et al. | 293/75 |
| 3,843,180 | 10/1974 | Alexander | 293/74 |
| 3,861,728 | 1/1975 | Haberle et al. | 293/62 |

*Primary Examiner*—John J. Love
*Assistant Examiner*—Andres Kashnikow
*Attorney, Agent, or Firm*—Michael Williams

[57] ABSTRACT

Our improved bumper is adapted to extend in conventional manner horizontally across an end of the frame of a vehicle, particularly a truck, or truck tractor, and comprises a center section which is firmly secured to the vehicle frame. End bumper sections are connected to respective opposite ends of the center section and normally are in longitudinal continuity therewith. A spring connection is provided between each end bumper section and a respective end of the center section to bias the sections to longitudinal continuity but permitting an end section to be moved toward an adjacent vehicle wheel when such end section strikes an object in the roadway. The spring connection is compact and constructed and arranged for disposition generally within the confines of the connected bumper sections. Each end bumper section has a curved portion which is adapted to engage the tire of an adjacent vehicle wheel when an end section receives an impact of sufficient force to drive it into the tire. The curved portion of the end bumper section prevents the latter from binding with the tire, or cutting into the same. Thus, when the impact force is cleared of the end section, the latter will be biased to return to normal position, the rotation of the tire assisting the return movement.

4 Claims, 6 Drawing Figures

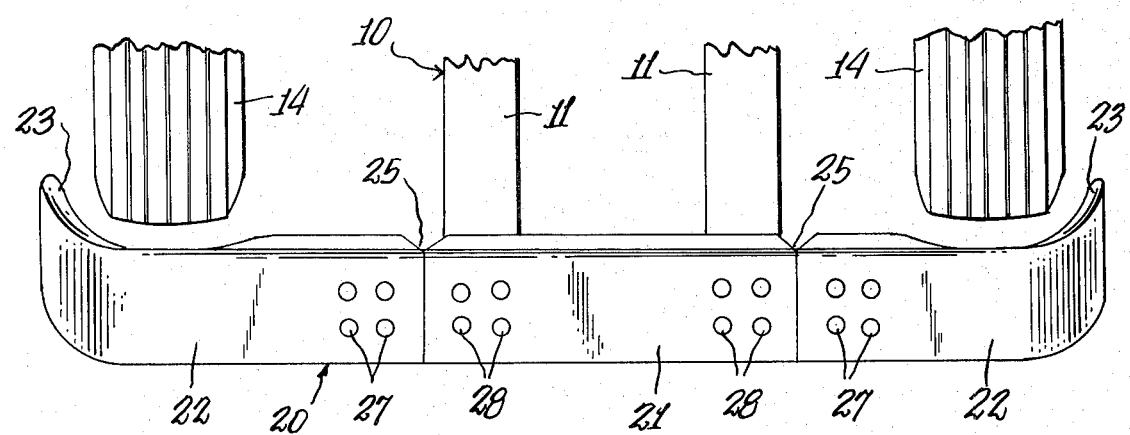
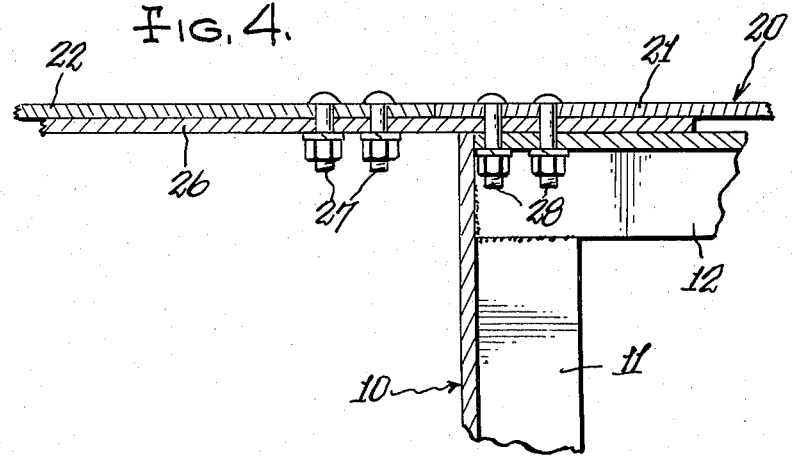
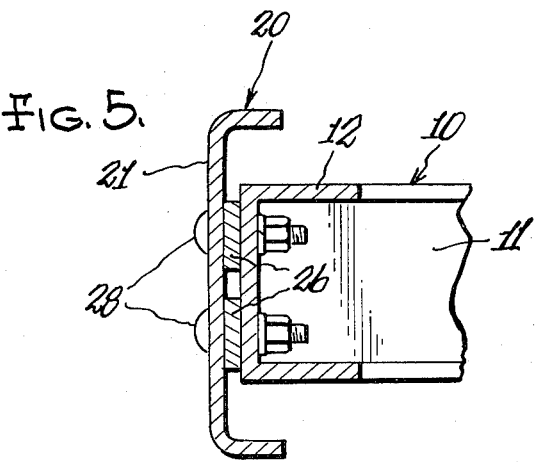
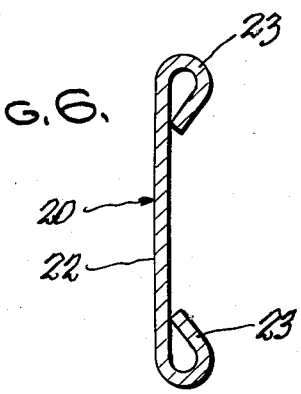

BUMPERS FOR VEHICLES

BACKGROUND AND SUMMARY

Bumpers guarding the front and rear of a vehicle are required by law in practically all countries. These bumpers, in many cases, are mere ornamental trim and offer little protection. Recently, attention has been directed to bumper construction designed to absorb the shock of a collision without material damage to the vehicle.

Trucks, and trailer-tractors, because of their sturdiness, continue to be manufactured with relatively heavy one-piece bumper, at least at the forward end of the vehicle, apparently with the thought in mind that the sturdiness will cause greater damage to the object with which the vehicle collides, than to the truck itself. This may be true where the impact is head-on, but it has been found that many truck drivers are killed or severely injured, and/or great damage is done to the rig, when an end of the bumper receives the impact, since such end is driven into the adjacent tire and causes loss of control of the rig.

Our improved bumper comprises a center bumper section which is securely fixed, as by bolting to the end of the vehicle frame and includes two end bumper sections which have spring connection with respective ends of the center section to be biased to a normal position wherein the sections are in horizontal longitudinal continuity, to look like a bumper of conventional construction.

The spring connections between the center section and respective end sections occupy very little space and are disposed within the confines of the sections. Leaf springs are preferred since they lie flat along the inside surfaces of the sections and therefore are hidden from view. The prior art includes sectional bumpers but their construction is such that they are unsuitable for use on modern trucks because their operating connections require too much space. In modern trucks, the bumper has very little clearance with the tires of the wheels and our improved bumper, as far as we are aware, is the only one to meet the requirements of the limited available space between bumper and wheels.

DESCRIPTION OF THE DRAWINGS

In the drawings accompanying this specification and forming a part of this application, there is shown, for purposes of illustration, an embodiment which our improved bumper may assume, and in these drawings:

FIG. 3 is a perspective view of our bumper, looking from the front thereof, and FIGS. 4, 5 and 6 are enlarged, fragmentary sectional views, corresponding respectively to the lines 4—4, 5—5 and 6—6 of FIG. 2.

DESCRIPTION OF THE PREFERRED EMBODIMENT

Our invention may be incorporated in vehicles of any type which include a frame and wheels carried by the frame, and may be connected to either or both the front and back of the frame. Our invention, however, is particularly suitable for use as a front bumper for a truck. The truck illustrated in FIG. 1 comprises a frame 10, including a pair of sturdy steel channels 11—11 which are spaced laterally and extend longitudinally of the truck. A plurality of cross channels extend between, and are rigidly connected to the longitudinal channels 11—11 so that the frame 10 is capable of supporting considerable weight. One cross channel 12 is shown in FIGS. 4 and 5, as welded across the longitudinal channels at the forward ends thereof.

Rubber-tired wheels are mounted on the frame in paired relation so that the wheels of each pair are disposed outwardly of respective longitudinal channels 11—11, in conventional manner. One such pair of wheels is mounted at the front of the frame, such as the steerable wheels 14—14. The normal truck includes an operator's cab 15 supported on the frame 10 and extending upwardly therefrom.

Figure 1:
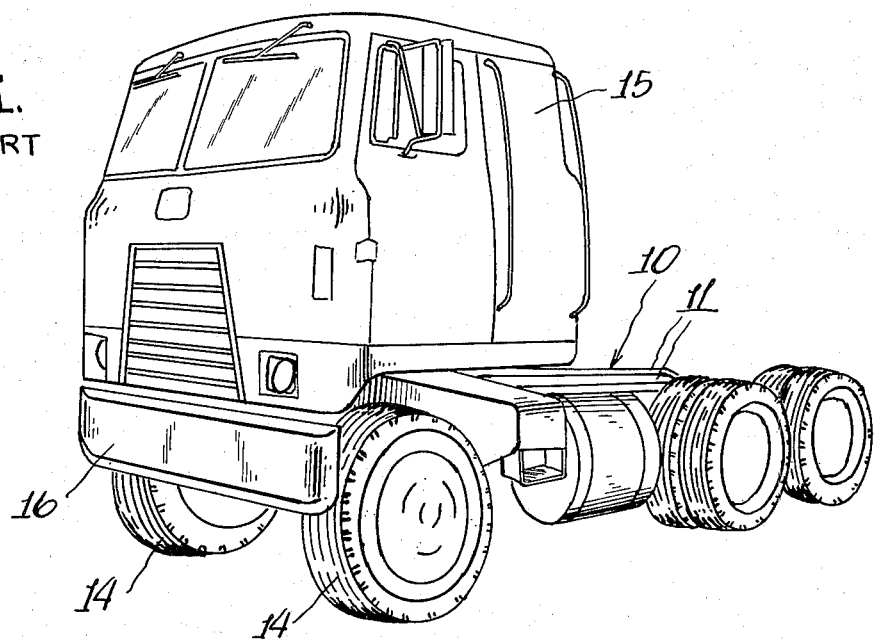
FIG. 1 is a perspective view of a conventional, modern-day truck chassis, to particularly show the limited clearance between the conventional bumper and the front wheels of the truck.
Figure 2:
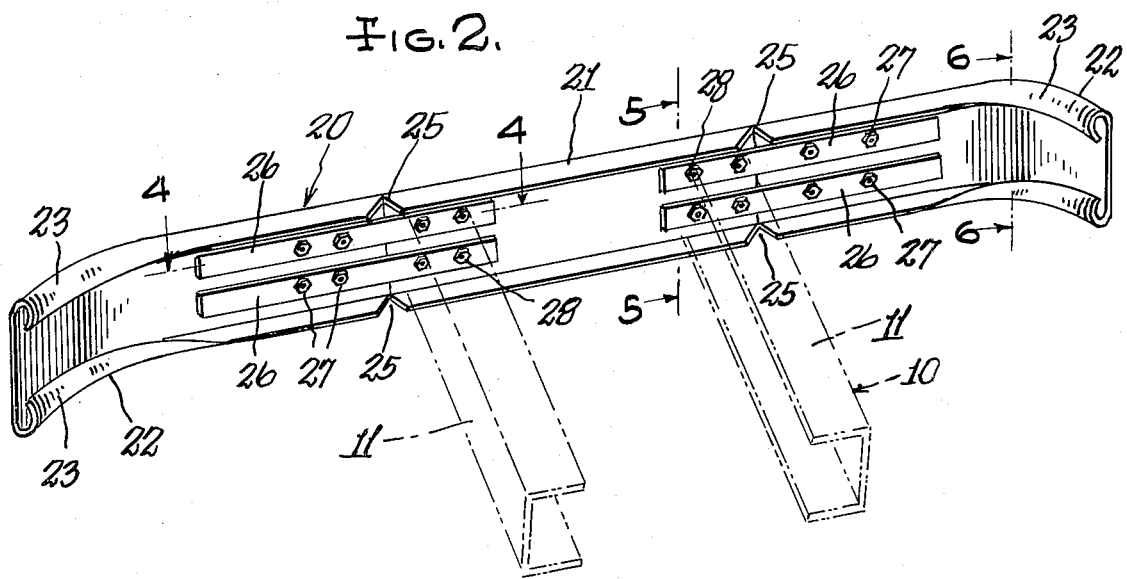
FIG. 2 is a perspective view looking at the rear of our improved bumper, with the frame shown in phantom lines.

The conventional bumper is shown at 16 in FIG. 1, and comprises a one-piece heavy steel stamping which is rigidly attached to the front end of the frame. It will be noted that the opposite end portions of the bumper 16 are positioned closely adjacent to the respective front wheels 14—14 for compactness in construction, the space between the wheels and bumper being only sufficient to allow clearance for steering of the wheels. Although the described construction provides a compact arrangement, it has serious disadvantages. For example, when an end portion of the bumper 16 strikes an obstruction with sufficient force, such end portion is bent backward and into the tire of the adjacent wheel. This could cause a tire blow-out, or lock the wheel, so that the rig could get out of control and result in serious injury to the truck driver and/or serious damage to the rig.

Our improved bumper is designated by the numeral 20 in FIGS. 2 through 6, and comprises a center section 21, formed as a heavy steel stamping, and rigidly connected to the front cross channel 12 or in any other suitable manner, to the front end of the frame. As seen in FIG. 5, the center bumper section has a shallow channel cross-section to provide rigidity.

The center section is disposed horizontally and, as seen in FIG. 3, is of a length not materially exceeding the spacing between the longitudinal channels 11—11. An end bumper section 22 extends from each end of the center section 21 and has spring connection with the latter, so as to be biased to longitudinal continuity therewith. Each end section is formed as a heavy steel stamping, having a cross-section preferably similar in size and appearance to the cross-section of the center section, except that the upper and lower portions of each end section are curled rearwardly, as seen at 23, to provide a smooth rounded surface. Adjoining ends of the center and end sections are notched, as shown at 25 in FIG. 2, to permit rearward swinging of the end sections.

Because of the limited clearance between each bumper and section and the peripheral surface of the tire guarded thereby, the spring connections between center and end sections should preferably be disposed within the confines of such sections. Ideally suited for this requirement is the leaf spring connection shown in the drawings. In the disclosed embodiment, two leaf springs 26—26 form a spring connection, each spring having a pair of holes to match holes in the respective end section for a bolt and nut fastening 27. The springs 26—26 are similarly provided with holes to match holes in the center bumper section for bolt and nut fastening 28. As seen in FIG. 4, the fastenings 28 may be utilized to secure the center section 21 to the cross channel 12. It will be noted, in FIGS. 2, 4 and 5, that the leaf springs 26 lie flat along the rear surfaces of the bumper sections and therefore are not only hidden from view but also do not interfere with the close spacing between end sections and the wheels they guard.

Our improved bumper provides safety features not possible with prior art bumpers. For example, if an end section strikes an obstacle with a relatively low impact, it merely swings rearwardly about its leaf spring connection, and immediately returns to normal position when the obstacle is cleared. As a matter of fact, the rearward movement of the end bumper section may save the lives of humans or animals, since it tends to deflect the same to the side and lessens the full force of impact.

In the event an end bumper section strikes an object with high impart force it will swing rearwardly and strike the peripheral surface of the adjoining tire. However, this will not cause the disasterous results of the prior one-piece rigid bumper because the rounded smooth edge of the bumper will engage the tire surface and the latter will merely rub over the rounded edge and rotation of the wheel will combine with the biasing force of the leaf spring connection to tend to return the end portion to normal position.

We claim:

1. A bumper for a vehicle having a frame including a pair of laterally spaced beams extending longitudinally of said vehicle, and rubber-tired wheels mounted in paired relation on said frame in conventional manner so that the wheels of each pair are disposed outwardly of respective beams adjacent the ends thereof, comprising a center bumper section rigidly secured to said frame at an end thereof and extending horizontally and crosswise of said frame beams, an end bumper section at each end of said center bumper section, each end section being disposed to guard an adjacent wheel of said pair of wheels against impact with an object on the road over which said vehicle travels, and leaf spring means disposed between and secured to each bumper end section and said center bumper section, constructed and arranged for disposition generally within the confines of and lying flat against said sections and operative to bias said end bumper sections to longitudinal continuity with said center section but permitting an end bumper section to be moved toward a respective wheel against the biasing force of its spring connection with said center section when said end section strikes an obstruction in the road.

2. The construction according to claim 1 wherein each of said end bumper sections is disposed in closely spaced relation with respect to the peripheral surface of the tire of a said adjacent wheel, each end bumper section having a curved portion adapted to strike the tire peripheral surface without injury to the latter, the rotating direction of said tire assisting the biasing force of the spring connection to return a respective end section to its longitudinal continuity with said center bumper section.

3. The construction according to claim 1 wherein said center bumper section is of a length not materially exceeding the lateral spacing between adjoining ends of said beams, opposite ends of said center section being bolted to an end of said frame, wherein one end of said leaf spring is bolted to said center section, and the other end of said spring is bolted to said center section by the same bolts that additionally secure the respective opposite center section ends to said frame end, and wherein each of said bumper end sections is disposed in closely spaced relation with respect to the peripheral surface of the tire of a said adjacent wheel, each end bumper section having a curved portion adapted to strike the tire peripheral surface without injury to the latter, the rotating direction of said tire assisting the biasing force of the spring connection to return a respective end section to its longitudinal continuity with said center bumper section.

4. The construction according to claim 1 wherein bolt means secures said center bumper section to said frame, said bolt means additionally securing said leaf spring means to said center bumper section.

* * * * *